US008175354B2

(12) United States Patent
Liang et al.

(10) Patent No.: US 8,175,354 B2
(45) Date of Patent: May 8, 2012

(54) SYSTEM AND METHOD FOR INTERACTIVE LIVER LOBE SEGMENTATION

(75) Inventors: Cheng-Chung Liang, West Windsor, NJ (US); Li Fan, Belle Mead, NJ (US); Feng Ma, Pennington, NJ (US); Guo-Qing Wei, Plainsboro, NJ (US); Jian Zhong Qian, Princeton Junction, NJ (US); Xiaolan Zeng, Princeton, NJ (US); Hong Chen, Plainsboro, NJ (US)

(73) Assignee: Edda Technology, Inc., Princeton Junction, NJ (US)

( * ) Notice: Subject to any disclaimer, the term of this patent is extended or adjusted under 35 U.S.C. 154(b) by 575 days.

(21) Appl. No.: 12/399,858

(22) Filed: Mar. 6, 2009

(65) Prior Publication Data

US 2009/0257630 A1    Oct. 15, 2009

Related U.S. Application Data

(60) Provisional application No. 61/034,340, filed on Mar. 6, 2008.

(30) Foreign Application Priority Data

Mar. 6, 2009    (WO) ............... PCT/US2009/036416

(51) Int. Cl.
*G06K 9/00* (2006.01)
*A61B 5/05* (2006.01)
(52) U.S. Cl. ..................... 382/128; 382/131; 600/407
(58) Field of Classification Search .............. 382/128, 382/131, 132, 154, 173; 345/156, 419, 501, 345/530; 600/407, 424
See application file for complete search history.

(56) References Cited

U.S. PATENT DOCUMENTS

| 6,734,847 | B1 * | 5/2004 | Baldeweg et al. | 345/419 |
| 7,840,044 | B2 * | 11/2010 | Ma et al. | 382/128 |
| 2006/0064396 | A1 | 3/2006 | Wei et al. | |
| 2007/0291000 | A1 | 12/2007 | Liang et al. | |

FOREIGN PATENT DOCUMENTS

WO    WO 2007/053676 A2    5/2007

OTHER PUBLICATIONS

International Search Report issued in International Patent Application No. PCT/US2009/036416, mailed May 11, 2009.

* cited by examiner

*Primary Examiner* — Georgia Y Epps
*Assistant Examiner* — Don Williams
(74) *Attorney, Agent, or Firm* — SNR Denton US LLP (57) ABSTRACT

Methods and systems for separating a 3D liver object are disclosed. A 3D liver object and selected associated vascular and other anatomic structures are displayed in a 3D space which is rendered on a 2D display screen. One or more 3D separating surfaces are placed in the 3D space based on anatomic structural landmarks that are segmented automatically or interactively, where each of the 3D separating surfaces intersects with the 3D liver object at a corresponding 3D pose. The 3D liver object into at least two sub-segments based on the 3D separating surfaces, which can be individually and independently adjusted directly in the 3D space, in real-time, and interactively by a user based on 3D and/or 2D information related to the 3D liver object, and the selected associated vascular and other anatomic structures.

16 Claims, 8 Drawing Sheets

SYSTEM AND METHOD FOR INTERACTIVE LIVER LOBE SEGMENTATION

RELATED APPLICATION

The present invention claims priority of provisional patent application No. 61/034,340 filed Mar. 6, 2008, the contents of which are incorporated herein in their entirety.

BACKGROUND

1. Technical Field

The present teaching relates to system and method for medical image processing and diagnosis. Particularly, the present teaching relates to system and method for interactive 3D medical image processing and diagnosis and systems incorporating the same.

2. Discussion of Related Art

In liver transplant or liver resection practices, an accurate liver division or liver lobe separation is crucial. Since each lobe is a self-contained unit which has its own vascular inflow, outflow, and biliary drainage, each lobe can be resected without damaging other parts of the liver. For example, according to the Couinaud classification, a liver can be subdivided up to 8 independent lobes (identified as Roman numerals I to VIII). However, in some practices, fewer numbers of subdivisions may suffice. For example, when a lesion occurs within a lateral segment of the left lobe, both Couinaud lobes II and III are usually removed based on the plane formed by the umbilical fissure (left lateral segmentectomy). Therefore, the number of divisions and ways of dividing a liver into such segments can be determined based on different application scenarios.

An effective tool that can offer the flexibility to enable a user to make different types of separation and/or perform needed surgical planning is of a great help. With advancement of technologies, images from various medical scanners are frequently post-processed by computer-aided software. A reconstructed 3D volume can be obtained by stacking a series of 2D images together. An internal organ such as a liver can be segmented either automatically via intelligent medical image processing software or by a human based on interactive segmentation tools. However, there are needs to further segment such a 3D volume into sub-parts. For example, a liver may include a plurality of lobes and there are situations in which individual lobes have to be separately identified. Systems or software that are currently offered in the market place provide only rather primitive tools to allow a user to manipulate a segmented 3D object such as a liver. They are usually 2D based and separating a 3D object into sub-parts has to be done based on 2D slices in a 2D data manipulation environment. It is very difficult to achieve the separation due to the fact that some of the landmarks or features in such a 3D object may be 3D in nature and it is often hard to visualize based on 2D slice images. It is also very time consuming and, thus, inefficient because users have to go through hundreds of slices one at a time.

BRIEF DESCRIPTION OF THE DRAWINGS

The inventions claimed and/or described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

DETAILED DESCRIPTION

The present teaching relates to systems and methods to provide an environment with tools contained therein where both three-dimensional (3D) and two-dimensional (2D) information are made accessible, and fused, and presented in such a manner to enable a user to interactively separate liver lobes or other parts of a liver that is segmented based on scanned medical images. Such interactive means to separate different parts of the liver is often for purposes of diagnosis, pre-surgical assessment, analysis, and planning, etc. The systems and methods disclosed herein enables a user to interactively define surfaces of arbitrary shape in accordance with the nature of the object, e.g., based on the anatomy of the liver, including any information available in 3D and 2D space to facilitate a user to separate liver lobes or any liver sub-segments in an interactive manner. Based on the liver anatomy, a user can apply certain domain knowledge with the help of intuitive interaction tools provided in accordance with the present teaching to separate the liver lobes/sub-segments in real-time with a greater degree of accuracy and efficiency when compare with the current available software packages.

Figure 1:
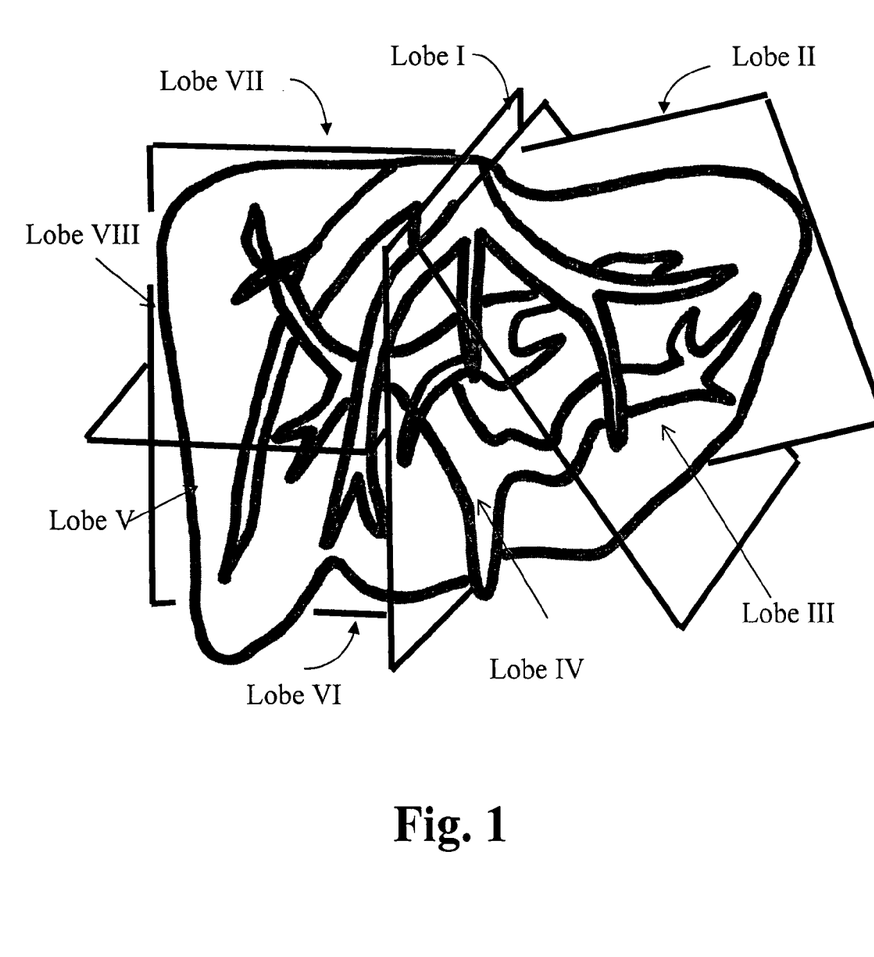
FIG. 1 illustrates the basic anatomy of liver lobes.

The liver lobe anatomy is first discussed. FIG. 1 illustrates the basic anatomy of liver lobes. Traditionally, surgeons resect liver tissue using only surface anatomic landmarks to divide a liver into lobes. With this approach, a surgeon identifies the hepatic artery and portal vein which provide the vascular inflow to the liver, the hepatic veins which provide vascular outflow, and the falciform ligament which lies within the umbilical fissure. For example, one broadly adopted scheme named Couinaud classification divides the liver into 8 independent lobes. A standard right or left lobectomy requires division along the plane of the middle hepatic vein. In a traditional sense, it is a plane from the inferior vena cava (IVC) to the gallbladder fossa usually along the middle hepatic vein and thus divides the liver into right and left lobes. The line projected onto the surface of the liver by this plane is known as Cantlie's line. However, it is the vasculature that determines the true boundary. For example, in Couinaud classification, the plane defined by the middle hepatic vein subdivides the liver into the true right and left lobes. Lobe IV lies to the left of the plane while lobes V and VIII lie to the right with VIII being superior to V. On the right lobe, the plane of right hepatic vein or intersegmental plane further separate right lobe into anterior (V and VIII) and posterior (VI and VII) divisions. The plane defined by the right branch of the portal vein divides the anterior and posterior divisions of the right liver superiorly and inferiorly, thus dividing the right lobe into 4 segments (V-VIII). The umbilical plane divides the left lobe of the liver into medial (lobe IV) and lateral (lobes II and III) divisions. This division is the only vertically oriented plane of division that is not defined by the hepatic veins. It can be defined on the surface of the liver by its associated landmarks. It extends from the umbilical fissure anteriorly through the ligamentum venosum along the lateral aspect of the caudate lobe. Structures within the plane of the umbilical fissure include the falciform ligament, ligamentum venosum, and the ligamentum teres. The ligamentum venosum and the ligamentum teres are remnants of the ductus venosus and umbilical vein respectively. The plane of the left hepatic vein defines the boundary between lobes II and III. Because the plane of the left hepatic vein is oblique, it forms a division between lobe III anteriorly and lobe II posteriorly. The most unique of the Couinaud classification is lobe I which corresponds to the caudate lobe (also known as the Spigel lobe). It is located on the posterior surface of the liver adjacent to lobe IV. Its medial and lateral boundaries are defined by the IVC and ligamentum venosum respectively. Lobe I is different from the other lobes in that its portal inflow is derived from the left and right branches of the portal vein, and it often has its own short hepatic veins connecting directly to the IVC. Because of the extensive crossing of vessels and its position relative to the porta hepatis and IVC, lobe I is not often resected.

In accordance with the present teaching, the task of separating one or more sub-segments of a liver, segmented previously, can be intuitively performed in a 3D scene based on 3D manipulation tools in conjunction with 2D viewing and manipulation tools. To segment a liver into sub-segments, one or more adjustable 3D surfaces can be employed in the 3D scene to isolate 3D regions of interests. In addition to displaying the liver, the 3D scene may also include the 3D rendering of selected vital structures that are associated with the liver, e.g. artery, hepatic vein, and portal vein, tumors, which are to be used as anatomic reference or landmarks for placing/adjusting the 3D separating surfaces in the 3D space. Each of such surface slices through the underlying liver and intersect with the liver that yield a 2D cross sectional view. Each 2D cross section may be used to show one slice of image through the liver in any arbitrary orientation and position by adjusting the position and orientation of the 3D separating surface.

In some embodiments of the present teaching, a number of orthogonal views that are parallel to the volumetric coordinates may be used to view the liver in saggital, coronal, and axial directions. For example, a 3D liver can be rendered in a 3D space and its cross-sectional contours or regions can be shown in each 2D view if the plane of the view intersects with the 3D liver. The image of a 2D view slice through the data volume can also be displayed within the 3D area with its position and orientation. In other embodiments of the present teaching, a number of views can also be generated with arbitrary orientations. Views of cross sections along the separating surface(s) can also be generated and viewed by a user to assess if any vital structures are cut through by the separating surface(s).

Figure 2:
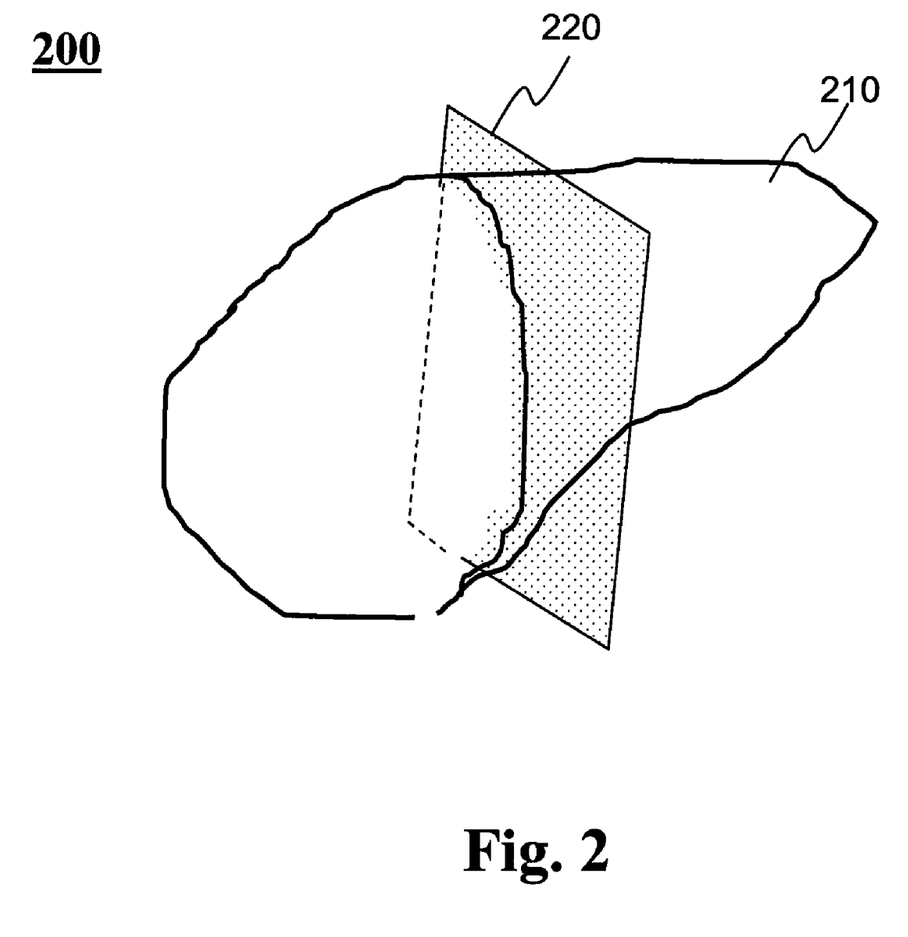
FIG. 2 illustrates that a 3D separating surface is used in a 3D space to obtain sub-segment of a 3D object, according to an embodiment of the present teaching.

FIG. 2 illustrates the concept, where a 3D object 210 is rendered in a 3D scene 200, and one illustrated separating surface 220 cuts through the 3D object 210 and separates the 3D object 210 into two halves, the left portion and the right portion of the 3D object, residing on the left and the right, respectively, of the 3D separating surface 220. The intersection of the 3D separating surface 220 and the 3D object 210 forms a cross section of the 3D object. The 3D space 200 can be rotated and zoomed and the 3D objects rendered inside the 3D space 200 are rotated and zoomed accordingly. In this way, a user can perceive the spatial relationships between 3D objects and the volumes effortlessly.

Figure 4A:
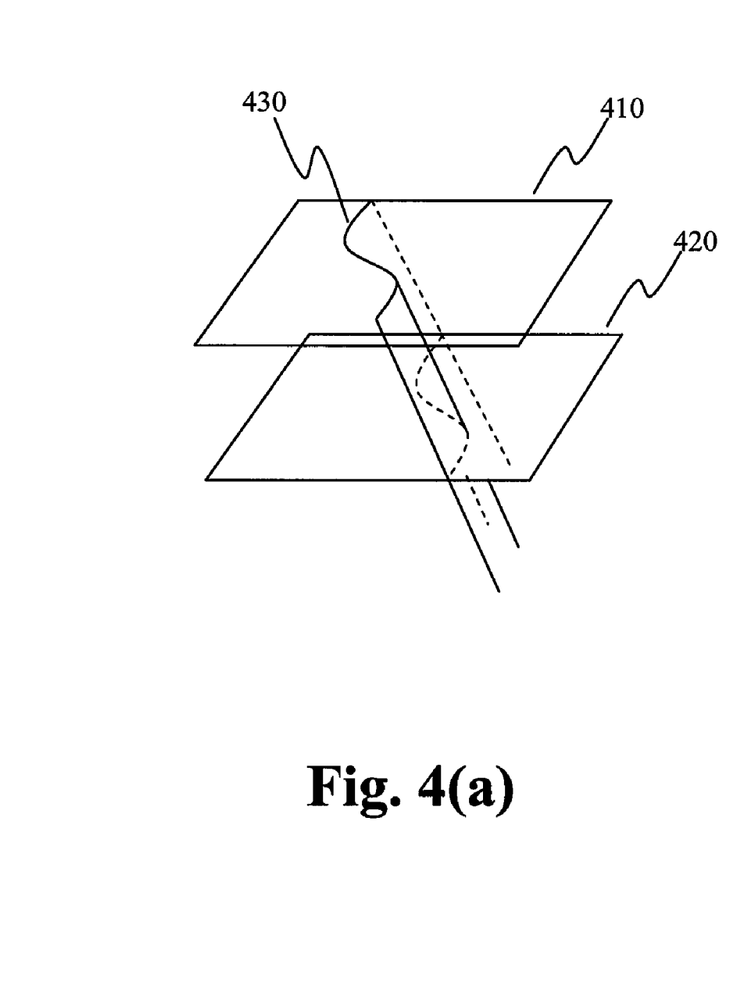
FIGS. 4(a) and 4(b) illustrate curved 3D surfaces as separating surfaces, according to an embodiment of the present teaching.
Figure 4B:
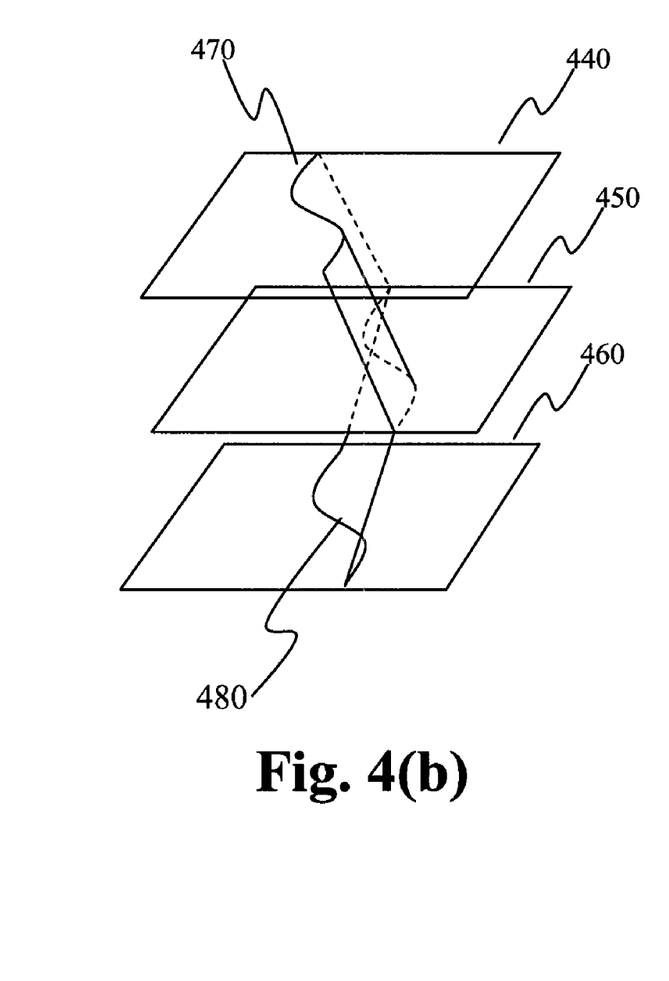

The separating surface 220 can be of arbitrary shape. FIG. 2 illustrates a 3D planar surface and FIG. 4(a) and FIG. 4(b) illustrate cylindrical 3D surfaces. In general, such a separating surface can be of any curved or shaped surfaces. In addition, both the 3D pose and the 3D shape of the separating surface can be dynamically adjusted to, e.g., fit the boundary pose and shape of the sub-segment of the liver. Such adjustments include, but are not limited to, repositioning, change of orientation, change of size, tilting, bending, and forming arbitrary curving. 3D separating surfaces may be edited in either in 3D or 2D for local shape adjustment.

In some embodiments, 3D separating surfaces may have initial shape located at an initial 3D pose, e.g., a plane or a cylindrical surface located at the center of a 3D object. Such initial positions, sizes, and shapes of 3D separating surfaces may be determined intelligently by an algorithm, application tools, or by users in an interactive manner. For example, a cylindrical surface may be initially generated by a free-hand drawing by a user on 3D display of the liver, by referencing vital structures or landmarks rendered in 3D with 2D corresponding information fused. Such a cylindrical surface may also be determined by a free-hand drawing along the cross section curve based on either the axial, coronal, or saggital views or arbitrary-angle MPR views. Such initial shape may also be determined by further combining the arbitrary-angle MPR views with Maximum or Minimum Intensity Projection view of the images, so that hepatic veins, portal veins, or artery may be better viewed to help identify a best cutting position.

An example of such a cylindrical surface is shown in FIG. 4(a). As illustrated, there are multiple cross sections 410 and 420. Based on information relevant to an application, e.g., estimated locations of hepatic veins seen in a MPR view, curve 430 may be drawn. This drawn curve 430 may be used to determine the shape of the 3D separating surface across different cross sections. The orientation of the cylindrical surface may be orthogonal to the plane on which the curve is drawn. The orientation of the cylindrical surface may also be to an arbitrary angle with respect to the drawing plane, as shown in FIG. 4(a). For example, the orientation of the cylindrical surface may be modified by adjusting the position of the cross section on a plane parallel to the drawing plane. Across different cross sections, the cylindrical surface may also be split into multiple segments, each of which has its own 3D orientation to best fit the 2D curves encountered on the 2D cross sections contained in the segment. This is shown in FIG. 4(b), where there are two segments shown, one segment being 470 between cross section 440 and 450 and the other being segment 480 between cross section 450 and 460. In this way, each segment has an independently determined orientation and, together, multiple segments of such curved surfaces fit the best with respect to a 3D object in the 3D space. Each of the segments constitutes an independent 3D separating surface.

In some embodiments, each 3D separating surface may be generated automatically and intelligently based on the size and shape of the some estimated object. For example, based on known anatomical information related to liver and its vascular structures, the initial positions, sizes, and shapes of 3D separating surfaces to be used to isolate a particular sub-segment of the liver may be automatically determined by an intelligent algorithm or software application. Such initial positions, sizes, and shapes may then be adjusted for, e.g., more accurately, by users via interactive means.

Such estimated 3D separating surfaces may be initially placed at the estimated initial positions in a 3D scene relative to the 3D object rendered therein. A user may interactively and in real-time manipulate the position, orientation, shape, and size of each individual 3D separating surfaces in the 3D space. Regarding the 3D pose of the separating surface 220, it can be dynamically adjusted by a user via dragging and/or rotating the surface. Such operations may be done in either 3D or 2D space. For instance, in a 3D space, certain 3D object manipulation tools may be deployed and used to adjust the 3D pose of the 3D separating surface.

Figure 3:
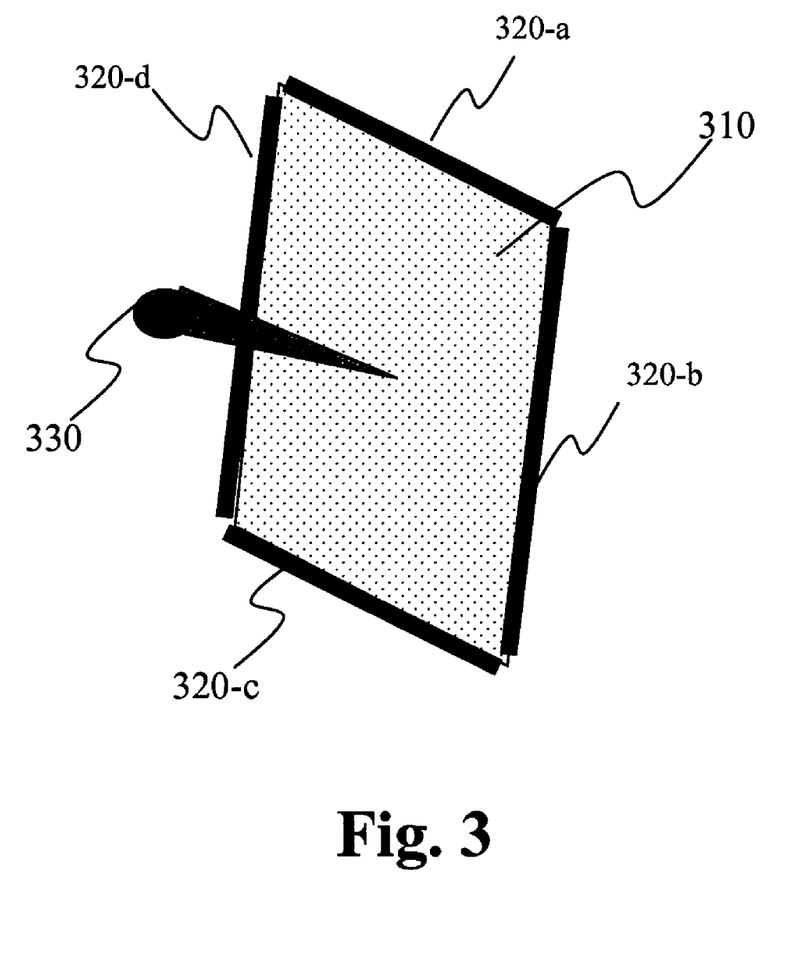
FIG. 3 shows an example of a 3D separating surface which can be manipulated via a 3D joystick-like handler, according to an embodiment of the present teaching.

FIG. 3 shows such an example, in which a 3D separating surface 310 can be moved around via, e.g., a 3D joystick-like handler 330, which can be used to rotate and shift the surface 310. This joystick-like handler has three functional parts, namely the tip (the end that is farther away from the 3D surface in FIG. 3), base (the end that touches the 3D separating surface), and body of a joystick. The tip of the joystick may be used to rotate and change the orientation of the surface. The base of the joystick may be used to move along the plane to create a center of rotation so that a user can rotate the 3D surface with respect to the new center. The body of the joystick may service as a glider along which the 3D separating surface may slide through the 3D object along the longitude direction of the joystick.

Figure 6A:
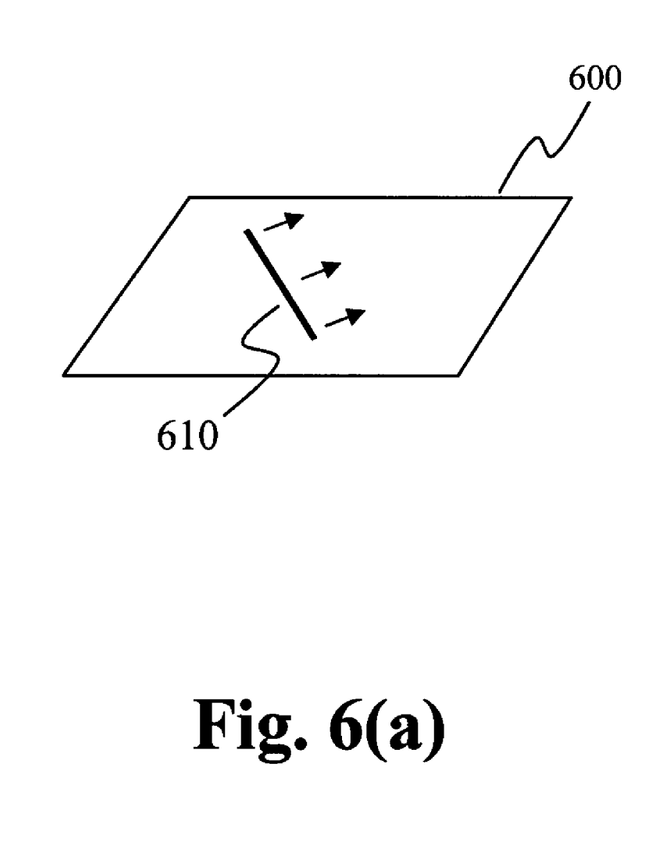
FIGS. 6(a) and 6(b) depicts different means to manipulate a 3D separating surface based on 2D manipulation on a 2D image, according to an embodiment of the present teaching.
Figure 6B:
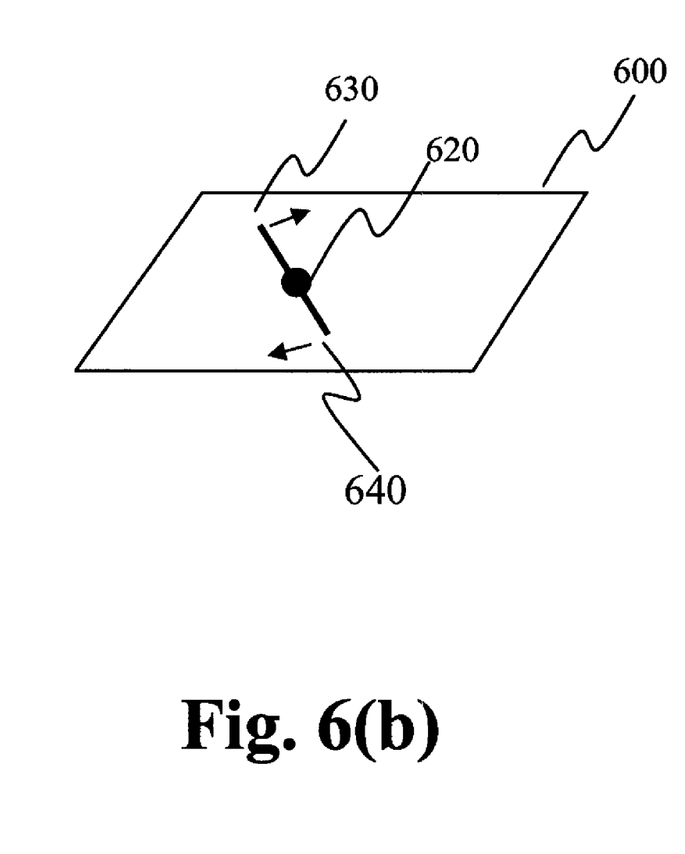

FIGS. 6(a) and 6(b) illustrate the adjustment of a 3D separating surface on 2D views. When the 3D separating surface 220 cuts through the 3D object 210, it creates a cross section which is the intersection between the 3D object 210 and the separating surface 220. This cross section can be viewed via a 2D image and the 3D separating surface 220 has a projection on the 2D cross section view. Contours/lines/curves that a 3D separating surface projects on a cross sectional view can be superimposed, in such 2D cross sectional views, on the intensity information of the voxels. The intensity information of the voxels on the separating surface may also be displayed on the separating surface for visualization or reference based on, e.g., MPR or curved MPR rendering. This is illustrated in FIG. 6(a), where cross section view is 600 and the projection of the 3D separating surface 220 is, e.g., a 2D line if the 3D separating surface is a planar. The 3D pose of the 3D separating surface 220 may be moved around by moving the projection line on a particular 2D cross section view. In this example, the projection line 610 may be moved towards the right so that the entire 3 D separating surface 220 is moved to the right of the underlying 3D object.

The 2D projection of the 3D separating surface on a 2D cross section may also be used to rotate the 3D separating surface. This is illustrated in FIG. 6(b). The projection of a 3D separating surface on a 2D cross section (which is a 2D curve in general) may be rotated around a center of rotation 620 by rotating the either end of the projection, e.g., one end 630 and the other end 640. Such a rotation of the 2D projection may cause the entire 3D separating surface to rotate and is done by rotating the projection on a 2D cross section via 2D data manipulation.

Figure 5:
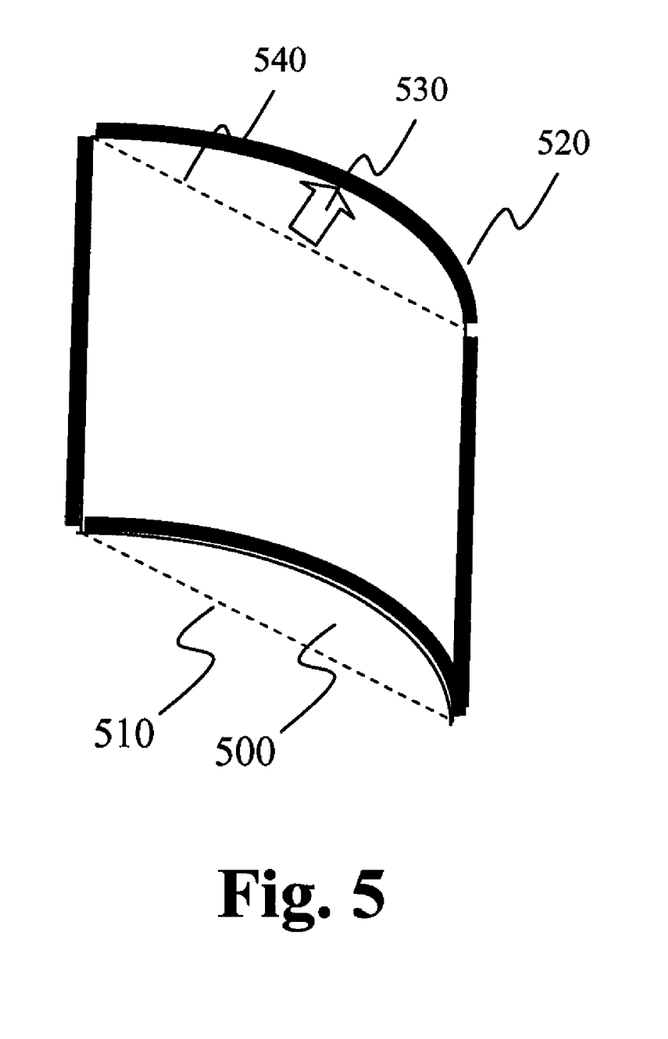
FIG. 5 depicts that a planar separating surface can be adjusted to form a curved surface via 3D manipulation, according to an embodiment of the present teaching.

As discussed herein, the shape of a 3D separating surface, e.g., 220, may also be dynamically adjusted based on need. For example, a 3D separating surface may be manually bended to certain degree to form a desired shape. In some embodiments, a user can bend a 3D separating surface in a 3D scene by grabbing some graphical manipulators, which can be defined as certain portions of the 3D separating surface. Some exemplary graphical manipulators with respect to a planar surface are depicted in FIG. 3, where four edges, 320-a, 320-b, 320-c, and 320-d, of the 3D separating surface 310 are used as graphical manipulators. With such graphical manipulators, a user may grab an edge of the 3D separating surface and drag away from its original position. A bended surface may be generated by allowing two parallel lines associated with the edge dragged to be pulled simultaneously in accordance with the dragging direction. This is illustrated in FIG. 5. In FIG. 5, one of the horizontal edges (the top one 540) is grabbed and pulled away from its original position in a direction shown as 530. The original 3D separating surface 500 is a planar shape and to react to the movement of the top edge 540, the system as discussed herein allows the parallel edge 510 to be simultaneously pulled in the same direction as edge 540 in the direction shown as 530. The way the two parallel edges are bended may depend on the point of the drag. For example, if the drag point is at the middle of the edge, the bended curve for each edge after the dragging may be symmetric. Otherwise, the adjusted curve may not be symmetric. The top and bottom edges 540 and 510 may be bended in the same way and a modified surface may then be generated by, e.g., interpolating all the surface points based on the new top and bottom edges. In some embodiments, the system may allow only one edge to be bended (without permitting the parallel edge to be handled accordingly) so that a different surface will be generated. Similarly, other edges, e.g., the vertical edge 520, can be manipulated in the same manner to adjust the shape of the original 3D separating surface. The bended degree of each edge can also be different to produce more bended patterns of surface. In some embodiments, a user may be allowed to elevate or dent any point on the surface to produce various combinations to produce, e.g., rippled or any other arbitrary surface shapes. In some embodiments, a user may be allowed to define control points/edges/patches on the 3D separating surface so that the bending/curving may be performed piecewise with respect to the separating surface.

Another way to do bending or curving of surface may be through the use of a 2D view plane. By selecting a 2D view in a certain orientation and/or location, a user can draw a line or a curve in the selected 2D view. The drawn line or curve can then be extended along an orthogonal direction or along any arbitrary direction with respect to the 2D view plane to create a 3D separating surface.

As discussed herein, the projected cross-sectional contours/lines/curves of a 3D separating surface are superimposed in the 2D views. A user may adjust the projected cross-sectional contours/lines/curves in a 2D view to adjust the location and/or orientation of a underlying 3D separating surface by moving or bending or piecewise/freehand/arbitrary editing the projected contours/lines/curves to create different 3D separating surface. For example, as shown in FIGS. 6(a) and 6(b), a projected cross-sectional line can be shifted laterally via, e.g., a mouse-dragging operation (FIG. 6(a)) or rotated, e.g., with respect to a user defined center of rotation 620 (FIG. 6(b)), which may cause an adjustment made to the entire 3D separating surface in terms of shape.

The process may be repeatedly applied to continually adjust the 3D separating surface until it forms a desired shape at a desired location. For example, in order to isolate a specific lobe of a liver, a plurality of 3D separating surfaces may constitute places along different facets of the lobe. Then to reach a better segmentation of the lobe, each separating surface may be adjusted to fit the shape of a particular facet of the lobe until the fit is desirable. When all separating surfaces are adjusted in such a manner, they together isolate the lobe in the 3D space.

In operation, the system as disclosed herein may store one or more previous pose information for each 3D separating surface so that backtracking operation can be performed. For example, if a series of adjustments made prove to be not desirable, a user may invoke the backtracking operations to go back previous states, including the initial state. Such previous states include previous poses, shapes, and sizes. Particularly, the system as disclosed herein may offer the option of allowing a user to reset the pose and size of a 3D separating surface back to its initial state or reset the bended surface back to its original surface shape via simple means such as a click on a particular bending edge or surface.

According to some embodiments, the present teaching may also facilitate operations that allow a user to manipulate and manage the 3D working environment. In some embodiments, to enable users to more effectively separate a desired segment of a 3D object, e.g., a liver previously segmented, the system may allow a user to control the visualized appearance of the desired segment of the liver. For example, a desired segment, which is also a 3D object, may be rendered in a transparent or a semi-transparent mode so that the anatomical structures internal to the desired segment, such as vascular trees or lesions, can be made more visible. In certain applications, this can be very important when users desire to ascertain that a separation boundary will not cause any damages to any major arteries or veins. When a separation boundary does go through an vulnerable part of the organ, a user may rely on such transparent views to adjust the separating planes or surfaces to avoid potential problem (e.g., in surgical planning to remove a liver tumor).

In some embodiments, the degree of transparency of the separating surface may also be adjusted, e.g., from totally opaque to a range of degrees of transparency. An opaque separating surface allows a user to easily perceive separated pieces on two sides of the separating surface. A 3D separating surface rendered in a transparent mode allows a user to see through both sides of the separating surface. A user may adjust the level of transparency based on the application needs or personal preferences. Intensity information of the voxels on the separating surface may also be displayed on the separating surface for visualization or reference using MPR or curved MPR rendering.

The rendering of each individual 3D object may also be made flexible. For example, each object may be displayed in a visible or invisible mode. Relying on such options, a user can manipulate the display mode to see any parts of a 3D object, including occluded spots from any particular perspective.

When a desired sub-segment of a 3D object, e.g., a liver, is separated using 3D separating surfaces, a user may also set the rendering mode in such a way that only the desired sub-segment is visible and other liver lobes or sub-segments can be made invisible to help a user to focus only on the desired sub-segment. A user can also opted to selectively allow some lobes or sub-segments being made visible based on application needs. In some embodiment, a user may also adjust the level of visibility of individual sub-segments to different degrees based on application needs.

In accordance with the present teaching, the system as disclosed herein may also be implemented to facilitate spatial correlation and synchronization between 3D manipulation and 2D cross sectional views and vice versa. For example, when a 3D object is moved/rotated/modified in the 3D space, relevant projections of the 3D object in corresponding 2D cross-sectional views may be modified in a manner consistent with the modification in the 3D space. Conversely, when modifications are made to the 2D projection of a particular 3D object in 2D cross sectional views, such modifications will be translated into the 3D space in a manner consistent with the 2D modifications. This makes it possible for a user to more freely manipulate 3D object in a 3D space based on actual needs without having to mentally mapping modifications made based on 3D manipulations to changes in the 2D space to ensure consistency and vice versa.

Figure 7:
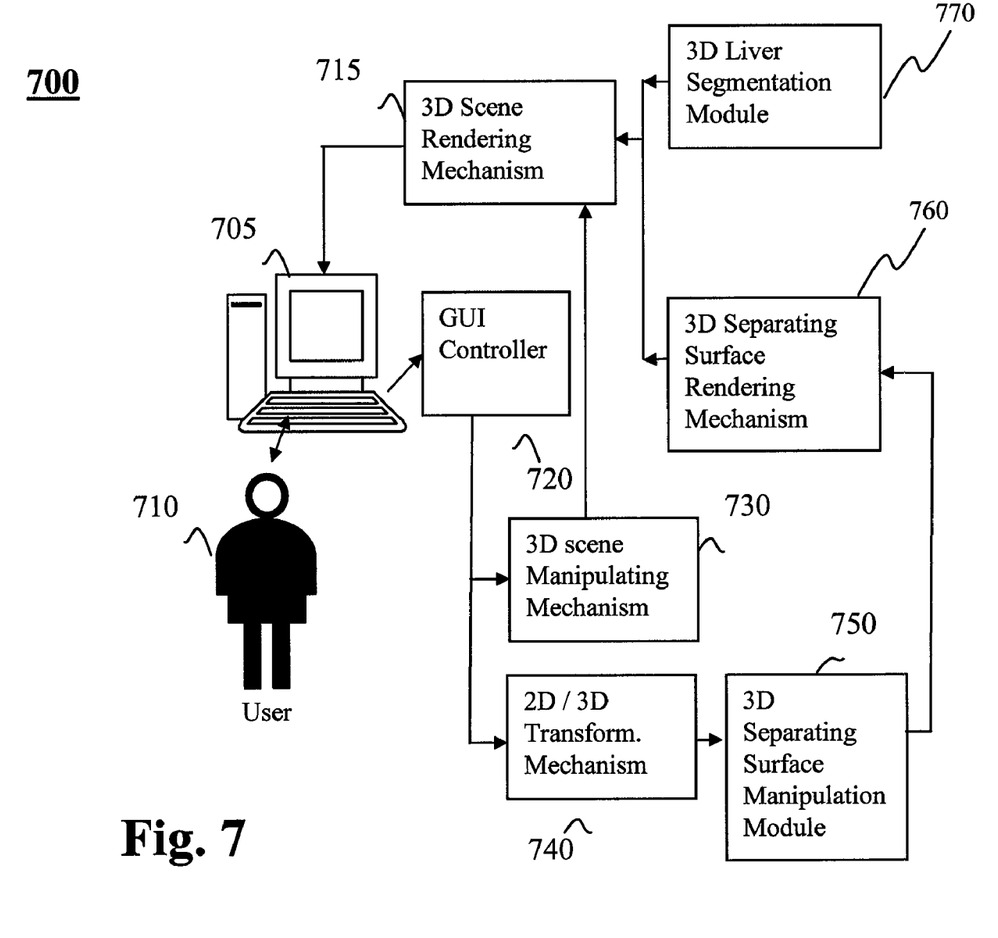
FIG. 7 depicts an exemplary system diagram for separating a 3D object into sub-segments in 3D space, according to an embodiment of the present teaching.

FIG. 7 depicts an exemplary overall system architecture 700 for separating sub-segment of a 3D object, according to an embodiment of the present teaching. The system 700 comprises a 3D liver segmentation module 770, a 3D scene rendering mechanism 715, a graphical user interface (GUI) controller 720, a 3D scene manipulation mechanism 730, a 3D separating surface manipulation module 750, and a 3D surface rendering mechanism 760. The 3D scene rendering mechanism 715 is designed to render a 3D scene on a display screen 705. A 3D scene rendered by the 3D scene rendering mechanism 715 may include different 3D entities such as a 3D object to be further segmented (which may be previously segmented, e.g., a 3D liver from the 3D liver segmentation module), one or more 3D separating surfaces (specified by, e.g., the 3D separating surface rendering mechanism 760), data manipulation tools (e.g., joystick-like handler, invoked by a user via the GUI controller 720), individual sub-segments that have been further segmented, 2D cross section renderings in the 3D space (e.g., the left and right hepatic veins segmented by the user via interactions with the 3D scene manipulating mechanism 730), or possibly some textual data displayed therein to provide additional information (e.g., the user 710 may specify the names for individual sub-segments and request such names to be associated with such individual sub-segments via the GUI controller 720 and the 3D scene manipulating mechanism 720).

Thus, the 3D scene rendering mechanism 715 operates in accordance with information received from different modules/mechanisms to provide a coherent 3D rendering to the display screen 705. For instance, to display a 3D object to be further segmented on the display screen 705, the 3D scene rendering mechanism 715 retrieves a 3D object previously segmented from the 3D liver segmentation module. In addition, it may dynamically updates the 3D space rendering based on the user's instructions. For instance, it may dynamically receive control information from the 3D scene manipulating mechanism 730, which may take inputs from a user 710 instructing the system 700 how to render the 3D scene via the GUI controller 720. In addition, the user 710 may specify, via the GUI controller 720, as to, e.g., certain selected object is to be displayed in a transparent mode, selected degrees of opaqueness associated with certain selected objects, whether to show projected curved on 2D cross sectional views rendered in the 3D space, etc.

The 3D scene rendering mechanism 715 may also dynamically update the rendering of different 3D separating surfaces based on the adjustment on the existing 3D separating surfaces made by the user 710 via the GUI controller 720. The adjustment specified by the user 710 may go through certain transformations, performed by a 2D/3D transformation mechanism 740, which converts 2D coordinates, intercepted from the display screen 705 based on the user's manipulation on the 2D display screen, to actual 3D coordinates applicable to the 3D rendering space in order to render the desired adjustment appropriately. For example, the user may drag, on the display screen which is 2D, a particular straight edge of a specific 3D separating surface, which yields a series of 2D coordinates representing a curve modified by dragging the straight edge. Those 2D coordinates need to be converted to new 3D coordinates representing the new 3D curve corresponding to the 2D curve.

Such converted 3D coordinates are then sent to the 3D separating surface manipulation mechanism 750 that applies the new 3D coordinates to the particular straight edge of the specific 3D separating surface and replace it with a 3D curve determined based on the new 3D coordinates. Such a newly formed new 3D curve may be then sent to the 3D separating surface rendering mechanism 760 where the new 3D curve may be smoothly connected to previous specific 3D separating surface and an updated 3D separating surface may be generated. Such an updated 3D separating surface is then sent to the 3D scene rendering mechanism 715 so that the 3D rendering of the previous 3D separating surface is updated in accordance with the user's manipulation.

Figure 8:
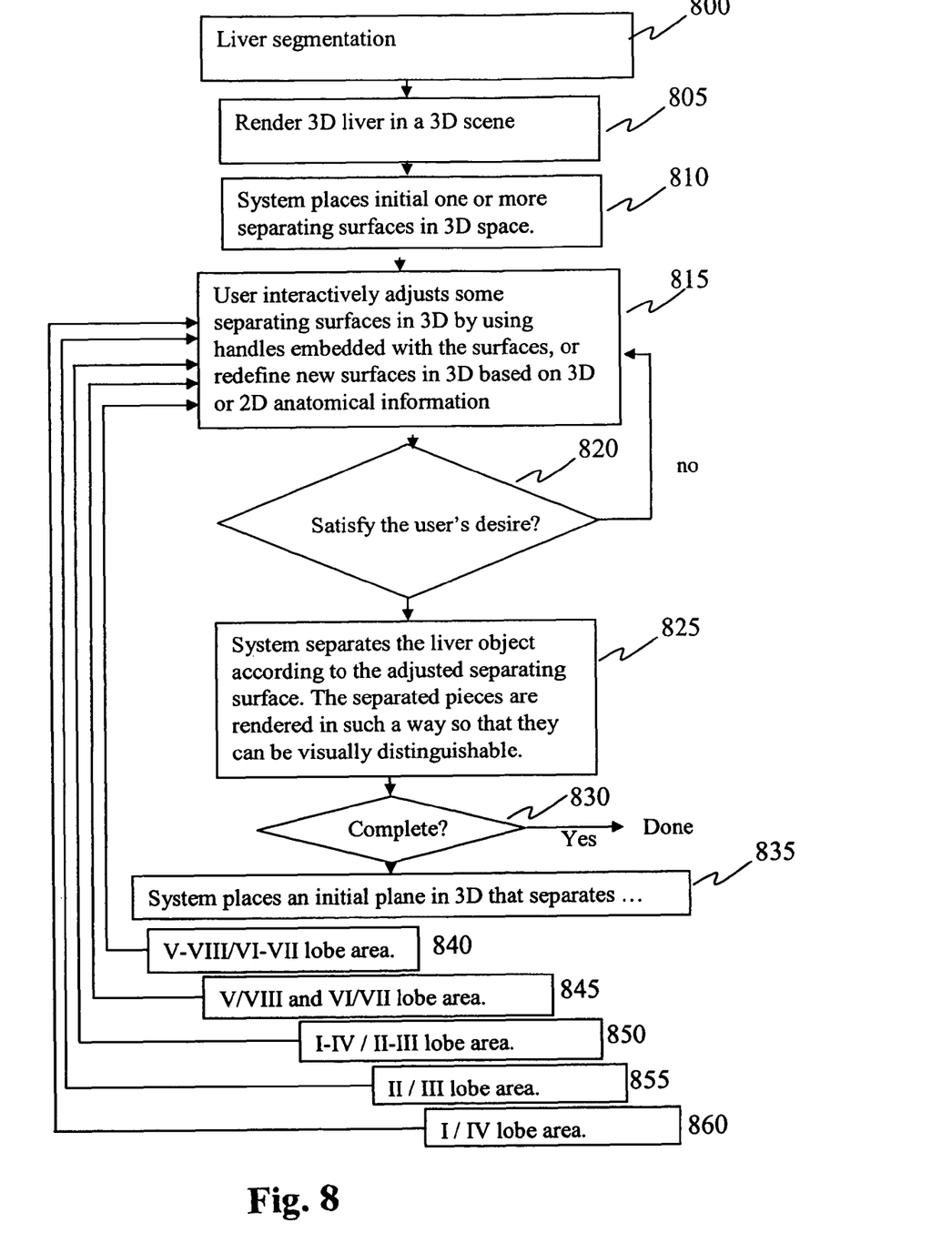
FIG. 8 is a flowchart of an exemplary process in which 3D separating surfaces can be generated and manipulated to achieve segmenting a 3D object into sub-segments, according to an embodiment of the present teaching.

FIG. 8 is a flowchart of an exemplary process through which one or more sub-segments of a previously segmented 3D object can be separated, according to an embodiment of the present teaching. In this exemplary illustration, a 3D object corresponds to a liver. At 800, liver segmentation is first performed based on, e.g., 3D volumetric data acquired from a certain medical imaging modality. Vital anatomies inside/nearby the liver may also be segmented and/or rendered in the 3D space and some may be selected as anatomic references or landmarks. This produces a segmented 3D liver, which serves as a starting point for the processing described herein. At 805, the 3D liver so segmented along with other vital anatomies inside/nearby the liver are rendered in a 3D space form an initial 3D scene. At 810, the system as disclosed herein renders one or more initial 3D separating surfaces in the 3D scene. Such initial 3D separating surfaces may be derived automatically by the system based on intelligent algorithms and embedded domain knowledge (e.g., the anatomic structures of the human liver) or using some system set default surfaces, e.g., planar or cylindrical surfaces. The locations of the initial placement of the initial separating surfaces may also be determined intelligently and automatically based on domain knowledge of the underlying application (e.g., place a planar surface in the middle of the liver to separate the liver into a left and a right portion). Alternatively, the initial locations may also be specified by the user.

Once the initial separating surfaces are placed at their initial locations in the 3D scene relative to the 3D object rendered, a user may, at 815, interactively make individual adjustment to each of the separating surfaces. Each adjustment made may be assessed based on some criteria, at 820, to see whether the updated surfaces meet the desire of the user. If the outcome does not meet the user's desire, the operation loops back to 815 so that the user can repeatedly make adjustment to the separating surface. In some embodiments, a user may redefine new surfaces in the 3D space based on 3D or 2D anatomical information. As an illustration, a user may draw a curve either within the 3D display surface or on a 2D image plan to define a new surface. This process repeats until the result is satisfactory or the user decided not to continue the adjustment process At 825, the system as disclosed herein then divide the 3D object into different sub-segments based on the adjusted separating surfaces. Such derived sub-segments may be rendered in accordance with the user's specification. Alternatively, the system may automatically deploy a rendering scheme so that each individual sub-segment derived is rendered in such a way that is distinguishable from other sub-segments. The system may then, at 830, inquire whether the user desires to have a next step.

Based on user-accepted separating surfaces, the system automatically generates, in several steps by, e.g., following the Couinaud classification the liver segments desired. In some embodiments, at the first step, based on a surface placed near the Middle Hepatic Vein, the system automatically separates the right and left liver. The second step at 840 is to separate the V-VIII sub-segment from VI-VII sub-segment in the right liver by placing a separating surface along the Right Hepatic Vein. The third step at 845 is to separate V sub-segment from VIII sub-segment and VI sub-segment from VII sub-segment by placing a separating surface along the Right Portal Vein. The fourth step at 850 is to define the umbilical surface that separates I-IV sub-segment from II-III sub-segment in the left liver. The fifth step at 855 is to separate II sub-segment from III sub-segment by placing by placing a separating surface along the Left Hepatic Vein. The sixth step at 860 is to separate I from IV, and sub-segment representing I/IV lobe area at 860.

The initial segmentation derived by the system in this manner may then be presented to the user and the process proceed to step 815 so that the user may fine tuning the segmentation result from the system by adjusting the system placed separating surfaces to achieve improved segmentation. Although presented in a certain order based upon domain specific knowledge or user preference/input, in actual operation, the number of steps performed or the sequence in which the steps are performed may vary. For example, in certain situations, it may be adequate to divide the liver into only two sub-segment, e.g., left and right liver. In this case, only one separating surface is needed to achieve the segmentation and a number of steps in FIG. 8 will not be carried out. In addition, use of specific separating surfaces may also vary depending on the liver/lobe/sub-segment classification scheme deployed. Furthermore, the workflow employed to separate sub-segments may also vary in order to tailor the system to support separation procedures of 3D objects other than the liver which may have their own distinct organ structure and definitions. Therefore, it is understood that the discussion presented herein is merely for illustration and difference from what is expressly stated herein will not deviate from the spirit of the present teaching.

Such derived sub-segments resulted based on the present teaching enable additional automatic computations that may be difficult to achieve without the method and system disclosed herein. For example, the volume of each individual sub-segment, e.g., each lobe, may be computed, which is an important consideration in connection with liver transplant and resection procedures. In one exemplary embodiment, the system, according to the present teaching, may be adapted to automatically explore the volume metrics associated with liver lobes/sub-segments. For example, when volume of each lobe/sub-segment is computed, whenever volume measurement function is needed, a user may simply use a mouse to point to the 3D lobe or sub-segment or highlight the object of interest so that volume metric associated with that 3D lobe/sub-segment can be displayed automatically on the screen near the object. Other metrics associated with a particular sub-segment may also be displayed. To maintain a visually pleasing display, the system may also be set so that when a user moves the mouse away from that object, the displayed metrics will disappear automatically.

There are also other extended functions enabled by the ability of deriving lobe/sub-segment separation. For instance, the separated liver lobes or sub-segments may be further used to recognize or distinguish the internal structures therein, e.g., the vascular trees into separated branches or lesions within each sub-segment. The system may be easily adapted to automatically calculate and display the sub-volume measurements of these separated internal structures.

While the present teachings have been described with reference to the certain illustrated embodiments, the words that have been used herein are words of description, rather than words of limitation. Changes may be made, within the purview of the appended claims, without departing from the scope and spirit of the invention in its aspects. Although the inventions have been described herein with reference to particular structures, acts, and materials, the invention is not to be limited to the particulars disclosed, but rather can be embodied in a wide variety of forms, some of which may be quite different from those of the disclosed embodiments, and extends to all equivalent structures, acts, and, materials, such as are within the scope of the appended claims.

We claim:

1. A method for separating a 3D liver object, comprising:
 displaying the 3D liver object and selected associated vascular and other anatomic structures in a 3D space rendered on a 2D display screen;
 placing one or more 3D separating surfaces in the 3D space based on automatically or interactively segmented anatomic structural landmarks, where each of the one or more 3D separating surfaces intersects with the 3D liver object at a corresponding 3D pose;
 separating the 3D liver object into at least two sub-segments based on the one or more 3D separating surfaces, wherein
 each of the 3D separating surfaces can be independently adjusted directly in the 3D space, in real-time, and interactively by a user based on 3D and/or 2D information related to the 3D liver object, and the selected associated vascular and other anatomic structures.

2. The method according to claim 1, wherein a sub-segment is a liver lobe.

3. The method according to claim 1, wherein the one or more 3D separating surfaces include at least one of:
 a 3D planar surface;
 a 3D cylindrical surface; and
 a 3D surface of an arbitrary shape.

4. The method according to claim 1, wherein each of the 3D separating surfaces is adjusted by at least one of:
 adjusting the 3D pose of the 3D separating surface; and
 adjusting the shape of the 3D separating surface.

5. The method according to claim 4, wherein the adjusting the 3D pose is based on a 3D manipulation tool.

6. The method according to claim 5, wherein the 3D manipulation tool is embedded with the 3D separating surface.

7. The method according to claim 6, wherein the 3D manipulation tool is a 3D joystick-like handle having a tip, a base, and a body, that are used to adjust the location and/or orientation of the 3D separating surface embedded therewith.

8. The method according to claim 4, wherein the 3D pose of a 3D separating surface is adjusted automatically based on domain knowledge related to the 3D liver object.

9. The method according to claim 4, wherein the intersection between each of the one or more 3D separating surface and the 3D liver object produces a corresponding cross section having a 2D structure thereon that is associated with the intersecting 3D separating surface.

10. The method according to claim 9, wherein the 2D structure on the corresponding cross section is at least one of:
 a line associated with a 3D planar separating surface;
 a curve associated with a 3D cylindrical or an arbitrary shaped separating surface.

11. The method according to claim 9, wherein the 3D pose of a 3D separating surface is adjusted based on a change made to the 2D structure on the corresponding cross section.

12. The method according to claim 9, wherein the shape of a 3D separating surface is adjusted based on a change made to the 2D structure on the corresponding cross section.

13. The method according to claim 4, wherein said adjusting the shape of a 3D separating surface comprises:
 identifying a sub-part of the 3D separating surface;
 editing the sub-part in the 3D space; and
 generating an updated 3D separating surface based on the 3D separating surface and the moved sub-part.

14. The method according to claim 4, wherein the shape of a 3D separating surface is adjusted automatically based on domain knowledge associated with the 3D liver object.

15. The method according to claim 1, wherein the 3D liver object comprises a plurality of independent lobes.

16. The method according to claim 1, wherein said placing 3D separating surfaces comprises:
 placing a first 3D separating surface along a middle hepatic vein within the 3D liver object to separate the 3D liver object into left and right livers;
 placing a second 3D separating surface along a right hepatic vein within the 3D liver object to separate a sub-segment from a VI-VII sub-segment in the right liver in the 3D liver object;
 placing a third 3D separating surface along a right portal vein within the 3D liver object to separate a V sub-segment from a VIII sub-segment and a VI sub-segment from a VII sub-segment in the 3D liver object;
 placing a fourth 3D separating surface corresponding to a umbilical surface within the 3D liver object to separate I-IV sub-segments from II-III sub-segments in the left liver of the 3D liver object;
 placing a fifth 3D separating surface along a left hepatic vein within the 3D liver object to separate II sub-segment from III sub-segment in the left liver of the 3D liver object; and
 placing a sixth 3D separating surface to separate I sub-segment from IV sub-segment.

* * * * *